(12) United States Patent
Chan

(10) Patent No.: US 7,212,846 B1
(45) Date of Patent: May 1, 2007

(54) FOLDABLE PHONE

(75) Inventor: Tien-Ming Chan, Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 11/328,243

(22) Filed: Jan. 10, 2006

(51) Int. Cl.
*H04M 1/00* (2006.01)

(52) U.S. Cl. .................. 455/575.3; 455/90.3

(58) Field of Classification Search ............ 455/550.1, 455/90.3, 575.1, 575.3
See application file for complete search history.

(56) References Cited

U.S. PATENT DOCUMENTS

| | | | |
|---|---|---|---|
| 2002/0107055 A1* | 8/2002 | Yamazaki et al. | ......... 455/575 |
| 2004/0092284 A1* | 5/2004 | Satoh et al. | ............. 455/550.1 |
| 2006/0058079 A1* | 3/2006 | Goto | ....................... 455/575.3 |

* cited by examiner

*Primary Examiner*—Nick Corsaro
*Assistant Examiner*—Amancio González
(74) *Attorney, Agent, or Firm*—Bacon & Thomas, PLLC

(57) ABSTRACT

The present invention is to provide an improved foldable phone having a first case and a second case, wherein the first case and the second case have an inclined face on one side thereof respectively, a function keypad set is disposed on the first case, a display screen is disposed on the second case, the inclined face of the second case has a protrusion part extending along an axis perpendicular to the surface of the second case having the display screen, and the protrusion part is hinged to the inclined face of the first case so that the second case can be rotated away from the first case, enabling the second case to be in a position perpendicular to the first case. As such, the improved foldable phone can provide a banner-type screen, while operating, to be operated in accordance with different communication functions.

10 Claims, 4 Drawing Sheets

FOLDABLE PHONE

FIELD OF THE INVENTION

The present invention relates to a foldable phone, and more particularly to an improved foldable phone including a first case and a second case being hinged together at corresponding inclined faces thereof, enabling the second case to be rotated away from the first case to a position perpendicular to the first case for providing a banner-type screen on the foldable phone.

BACKGROUND OF THE INVENTION

In view of the swiftly evolving global information technology and the communication industry, the advent of the era of the information technology and the mushrooming electronic industry has shortened the interpersonal distance in time and space. The mobile communication products stemming from computer are closely linked with our daily life. While the current electronic communication products (e.g. mobile phone, PDA, etc.) are prevailing and indispensable and the competition in the market are getting tougher, for sake of constantly developing to seize the pie, all leading communication manufacturers continuously weed through the old and bring forth the new without exception so as to win the hearts of users with the novelty and the delicacy. Users of electronic communication products are increasingly demanding, and as a result, providing the electronic communication products possibly addressing services, features and appearances to meet user's requirements becomes a challenging job.

Most of these conventional mobile phones initially pertain to straight phones in terms of the operation methods or the appearance. Owing to the striking external look and the less complicated style, such straight phones certainly have their days triggering the popular unrest. However, to take the screen protection into account and prevent from inadvertently pressing the keypad, and to add that the straight phones fail to provide large-size operation screen, clam-shell phones emerged for that end. A top case of the clam-shell phone is combined with one side of a lower case so that after both cases are both received the abrasion between the display panel and the keypad being idle can be alleviated. Whereas, as a result of multimedia functions vastly implemented in all sorts of mobile phones in addition to the function upgrade of digital cameras, users employ mobile phones to download and view video data and utilize the functions of digital cameras to take pictures of surrounding things and objects. As the screens of such clam-shell phones are mostly vertical, speaking of the customer satisfaction, the viewing and photographing angles thereof are hardly satisfactory for the straight phone.

As a consequence, the mobile phone capable of freely rotating with respect to multiple axes started emerging. As shown in FIG. 1, a screen 5 and a keypad 6 are disposed on such mobile phone. The screen 5 and the keypad 6 are coupled with at least two orthogonal rotating shafts 7 so that the screen 5 can be presented to user in a way mutually alternating the vertical and/or horizontal screen to meet the user's requirements to alternatively use the aforementioned two types of screens in case of concern of different functions and purposes. However, those rotating shafts 7 easily incur damage when those rotating shafts are applied to bend the screen 5 of the mobile phone. Besides, the wirings within those rotating shafts 7 are rather complicated, and those wirings may get twined to result in short-circuit and fault stopping continuous operation while rotating those rotating shafts 7. Therefore, how to develop an improved foldable phone to resolve the foregoing issue becomes a critical subject on top of the list.

SUMMARY OF THE INVENTION

In view of this, to improve the shortcomings of the conventional mobile phone, inventor makes every endeavor persistently to develop and do experiment so as to design an improved foldable phone of the present invention lastly.

In accordance with an aspect of the invention, an improved foldable phone is provided. The improved foldable phone has a first case and a second case, wherein the first case and the second case have an inclined face on one side thereof respectively, a function keypad set is disposed on the first case, a display screen is disposed on the second case, the inclined face of the second case has a protrusion part extending along an axis perpendicular to the surface of the second case having the display screen, and the protrusion part is hinged to the inclined face of the first case so that the second case can be freely rotated from one side of the inclined face of the first case to another side of the inclined face of the first case, enabling the surface of the second case having the display screen to be folded and cover onto the surface of the first case having the function keypad set, or the second case can be rotated away from the first case, enabling the second case to be in a position perpendicular to the first case. As such, the improved foldable phone can provide a banner-type screen, while operating, to be operated in accordance with different communication functions.

The above and other objects, features and advantages of the present invention will become apparent from the following detailed description taken with the accompanying drawings.

DETAILED DESCRIPTION OF THE PREFERRED EMBODIMENTS

Figure 1:
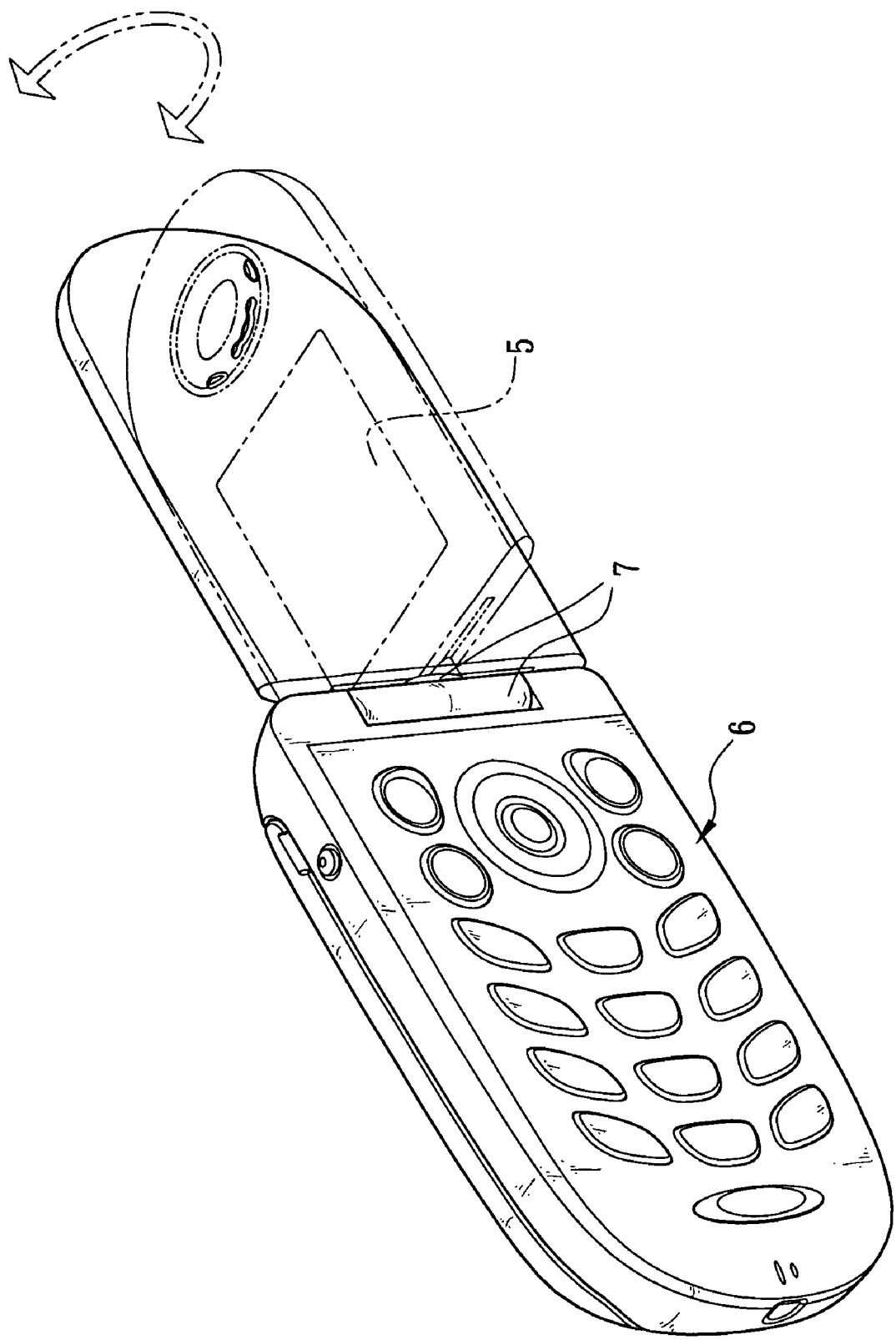
FIG. 1 is a schematic view of a conventional mobile phone.
Figure 2:
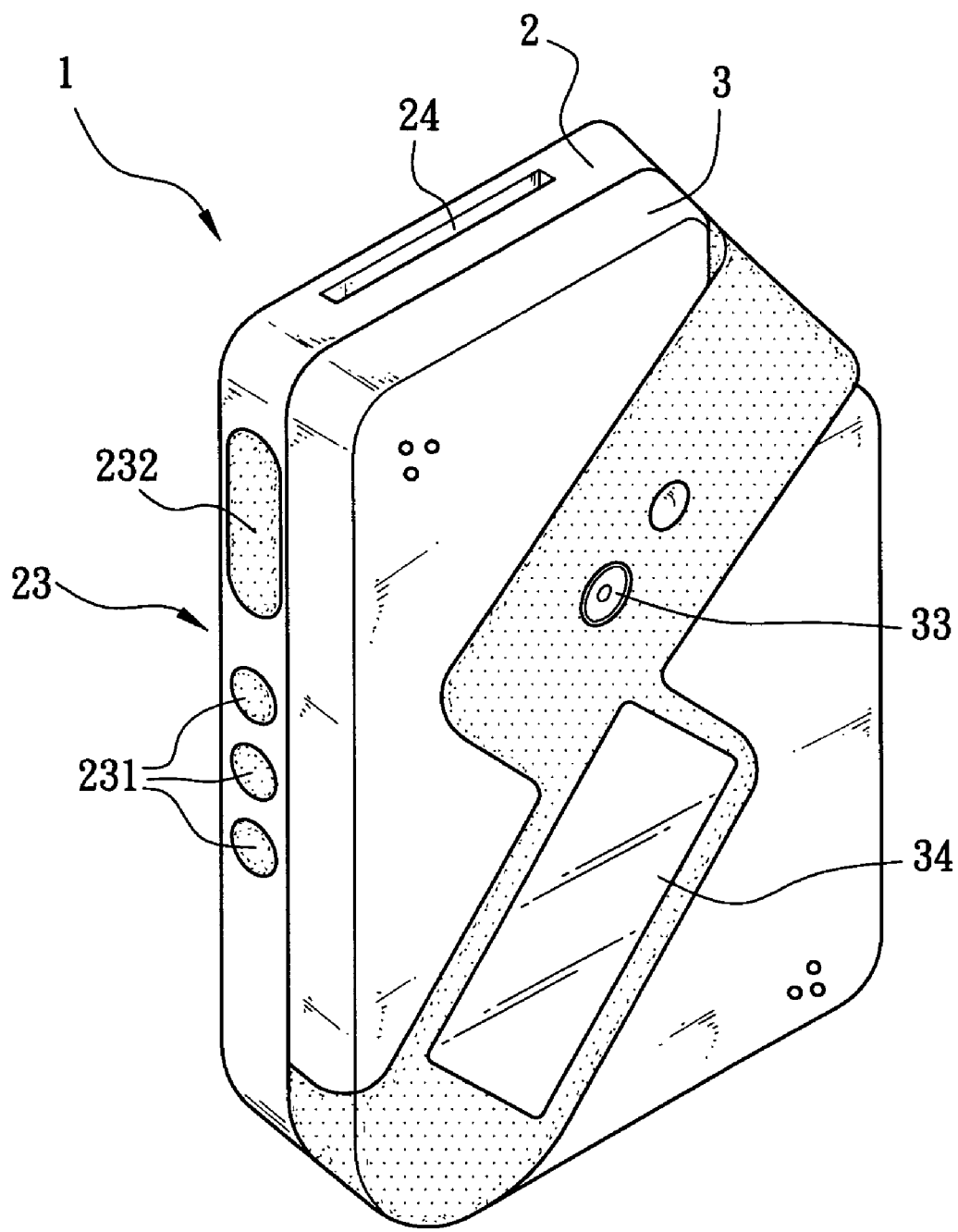
FIG. 2 is a schematic view showing a preferred embodiment of the present invention.
Figure 3:
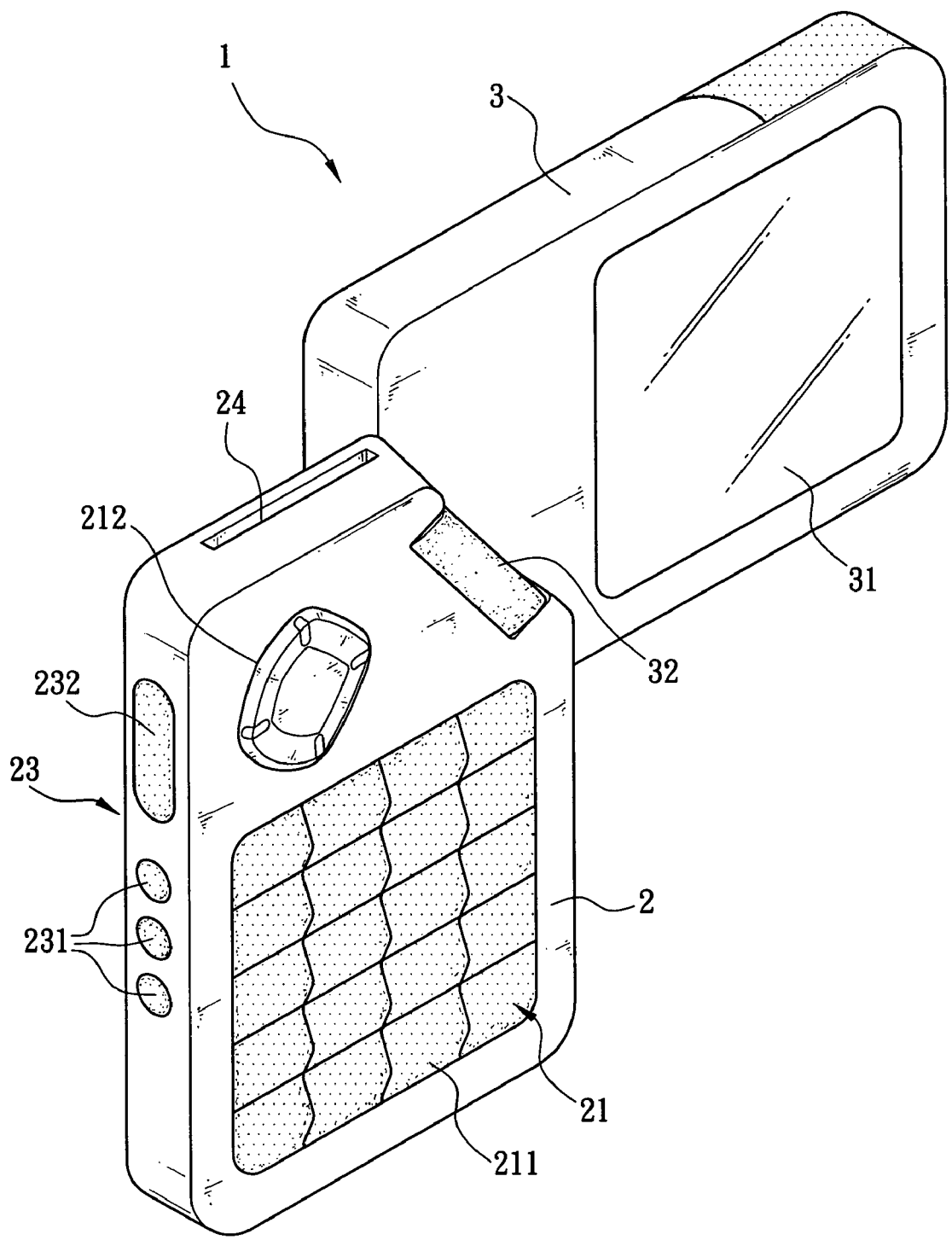
FIG. 3 is a schematic view showing the opened second case of the present invention.
Figure 4:
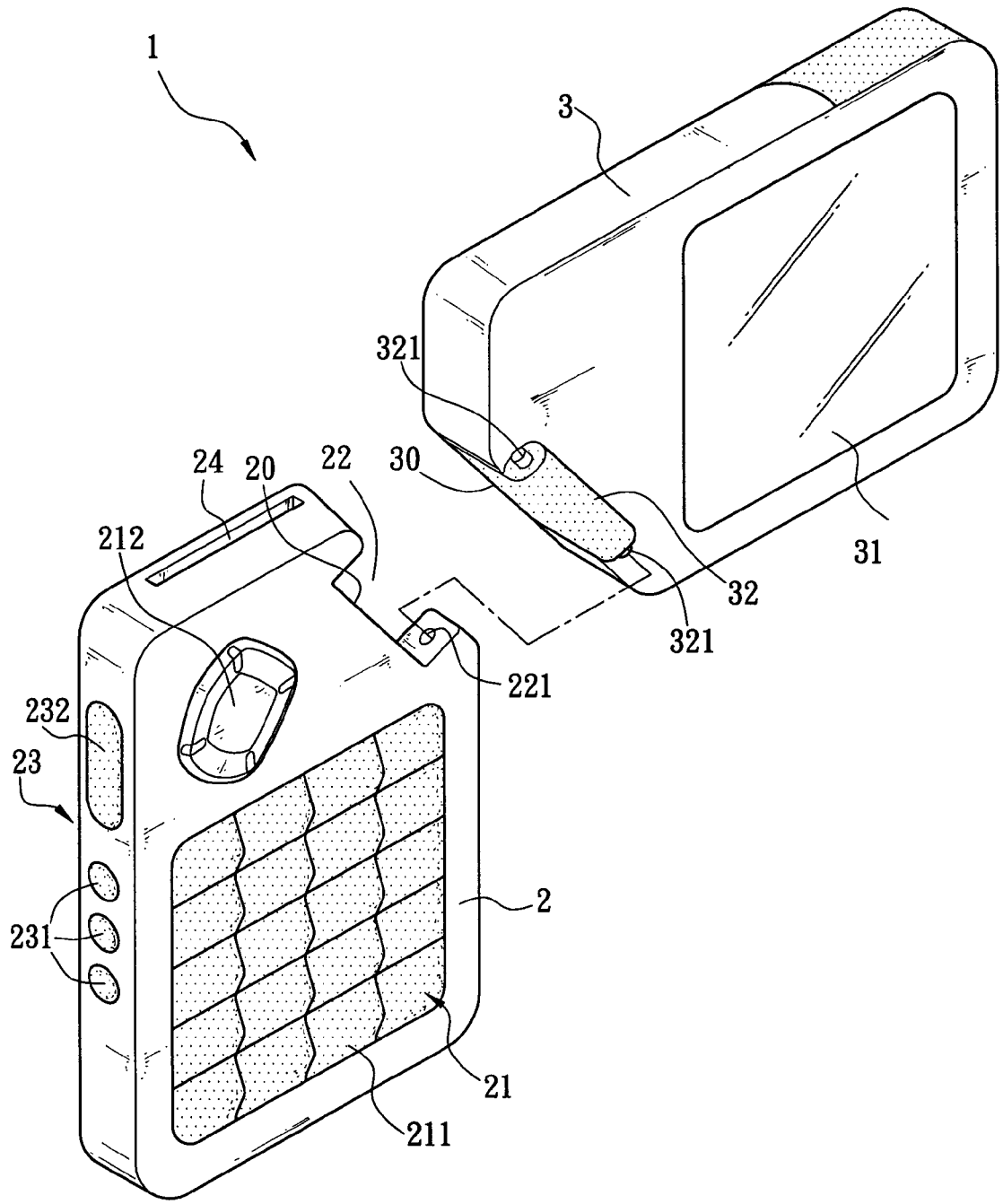
FIG. 4 is an exploded view showing the preferred embodiment of the present invention.

Please refer to FIGS. 2, 3 and 4 showing a preferred embodiment of the present invention, where an improved foldable phone is provided. The improved foldable phone includes a first case 2 and a second case 3, wherein the first case 2 and the second case 3 have an inclined face 20, 30 on one side thereof respectively such that the first case 2 and the second case 3 are each in a pentagon shape, a function keypad set 21 is disposed on the first case 2, a display screen 31 is disposed on the second case 3, the inclined face 30 of the second case 3 has a protrusion part 32 extending along an axis perpendicular to the surface of the second case 3 having the display screen 31, and the protrusion part 32 is hinged to the inclined face 20 of the first case 2 so that the second case 3 can be freely rotated from one side of the inclined face 20 of the first case 2 to another side of the inclined face 20 of the first case 2, enabling the surface of the second case 3 having the display screen 31 to be folded and cover onto the surface of the first case 2 having the function keypad set 21, or the second case 3 can be rotated away from the first case 2, enabling the second case 3 to be in a position perpendicular to the first case 2. As such, the improved foldable phone 1 can provide a banner-type screen, while operating, to be operated in accordance with different communication function. As shown in FIGS. 2, 3 and 4, the inclined faces 20, 30 of the first case 2 and second case 3, respectively, are each oriented at an angle of 135 degrees with respect to the adjacent surfaces thereto.

Moreover, please further refer to FIGS. 2, 3, and 4. A recess 22 is concavely disposed on the inclined face 20 of the first case 2. The recess 22 can exactly accommodate the protrusion part 32. A first connection part 221 (e.g. pin or hole) is disposed on both sides inside the recess 22 of the first case 2 respectively. A second connection part 321 (e.g. hole or pin) is disposed on both sides of the protrusion part 32 respectively and matches with the first connection part 221. Therefore, when the protrusion part 32 is inserted into the recess 22 and the two first connection parts 221 are connected with the two second connection part 321, the second case 3 can be freely rotated on the inclined face 20 of the first case 2.

Please further refer to FIGS. 2, 3 and 4 illustrative of the preferred embodiment. The function keypad set 21 includes a keypad 211 and a function cross button 212. The function cross button 212 is disposed on one side of the keypad 211. A multimedia control part 23 is disposed on a side of the first case 2 away from the inclined face 20. The multimedia control part 23 contains a plurality of buttons 231 and a switch pusher 231. A slot 24 is disposed on one side of the first case 2 in the proximity of the inclined face 20. The slot 24 can be inserted by a memory unit to carry out the data transmission task. Furthermore, an image-capturing lens 33 is disposed on another side of the second case 3 having the display screen 31. A mini display screen 34 is disposed on the second case 3 near the image-capturing lens 33 so that the mini display screen 34 displays messages reminding user of the signal of incoming call while there's an incoming call.

In accordance with the foregoing description, the improved foldable phone 1 differs from the conventional foldable phone. The first case 2 and the second case 3 of the improved foldable phone 1 are hinged together at the corresponding inclined face 20 and 30, such that after the second case 3 is rotated away from the first case 2, the display screen 31 of the second case 3 will be in a position perpendicular to the function keypad set 21 of the first case 2, providing an improved foldable phone 1 having a banner-type screen different from those shown in the conventional foldable phones.

While the invention herein disclosed has been described by means of specific embodiments, numerous modifications and variations could be made thereto by those skilled in the art without departing from the scope and spirit of the invention set forth in the claims.

What is claimed is:

1. A foldable phone, comprising:
   a first case in a pentagon shape having an inclined face on one side of said first case and a function keypad set disposed on another side of said first case in the proximity of said inclined face of said first case; and
   a second case in a pentagon shape having an inclined face disposed on one side of said second case and being hinged to said inclined face of said first case corresponding to said inclined face of said second case, and having a display screen disposed on another side of said second case in the proximity of said inclined face of said second case, such that said second case can be rotated away from said first case to a position perpendicular to said first case.

2. The foldable phone of claim 1, wherein said second case has a protrusion part extending from said inclined face of said second case along an axis perpendicular to the surface of said second case having said display screen and being hinged to said inclined face of said first case.

3. The foldable phone of claim 2, wherein a recess is concavely disposed on said inclined face of said first case to accommodate said protrusion part and a first connection part is disposed on both sides of said first case inside said recess, and a second connection part is disposed on both sides of said protrusion part and matches with said first connection part.

4. The foldable phone of claim 1, wherein said function keypad set comprises a keypad and a function cross button disposed on said another side of said keypad.

5. The foldable phone of claim 1, wherein a multimedia control part is disposed on one side of said first case away from said inclined face of said first case and said multimedia control part comprises a plurality of buttons and a switch pusher.

6. The foldable phone of claim 1, wherein a slot is disposed on one side of said first case in the proximity of said inclined face of said first case, and said slot receives a memory unit.

7. The foldable phone of claim 1, wherein said second case has an image-capturing lens on a side opposite said side having said display screen.

8. The foldable phone of claim 7, wherein a mini display screen is disposed on said second case in the proximity of said image-capturing lens.

9. The foldable phone of claim 1, wherein the inclined face of the first case has an included angle of 135 degrees with the adjacent faces respectively.

10. The foldable phone of claim 1, wherein the inclined face of the second case has an included angle of 135 degrees with the adjacent faces respectively.

* * * * *